(12) United States Patent
Shimosaka et al.

(10) Patent No.: US 12,340,030 B2
(45) Date of Patent: Jun. 24, 2025

(54) KEYBOARD APPARATUS IN WHICH TOUCH PAD IS LOCATED BASED ON FITTS'S LAW

(71) Applicant: PFU LIMITED, Kahoku (JP)

(72) Inventors: Kiichiro Shimosaka, Kahoku (JP); Yoshie Fuchigami, Kahoku (JP); Satoshi Kubota, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 18/647,997

(22) Filed: Apr. 26, 2024

(65) Prior Publication Data

US 2024/0419258 A1 Dec. 19, 2024

(30) Foreign Application Priority Data

Jun. 14, 2023 (JP) .................................. 2023-097935

(51) Int. Cl.
G06F 3/02 (2006.01)
G06F 3/0354 (2013.01)

(52) U.S. Cl.
CPC ........ G06F 3/0213 (2013.01); G06F 3/03547 (2013.01)

(58) Field of Classification Search
CPC .. G06F 3/0213; G06F 3/03547; G06F 3/0202; G06F 3/0227; G06F 3/021
See application file for complete search history.

(56) References Cited

U.S. PATENT DOCUMENTS 6,883,143 B2 * 4/2005 Driskell ................ G06F 3/0482
715/779
2021/0342015 A1 11/2021 Kasahara

FOREIGN PATENT DOCUMENTS

JP 2009-58986 A 3/2009
JP 2021-185474 A 12/2021

* cited by examiner

Primary Examiner — Rodney Amadiz
(74) Attorney, Agent, or Firm — WOMBLE BOND DICKINSON (US) LLP

(57) ABSTRACT

A keyboard apparatus includes an enclosure, a plurality of keys located on a top face of the enclosure, and a touch pad provided on at least one side face of the enclosure. A shortest distance D between a key assigned to a home position out of the plurality of keys and an upper end of a side face on which the touch pad is provided, and a width W of the touch pad satisfy an equation below $$2 < \log_2(1 + D/W) < 6.$$

10 Claims, 13 Drawing Sheets

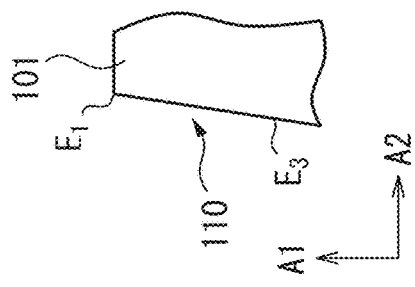
FIG. 8A
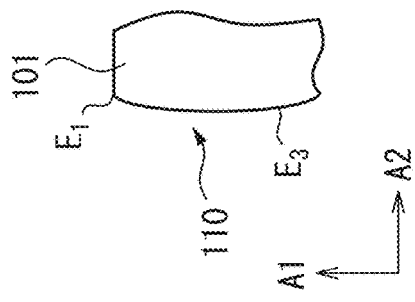
FIG. 8B
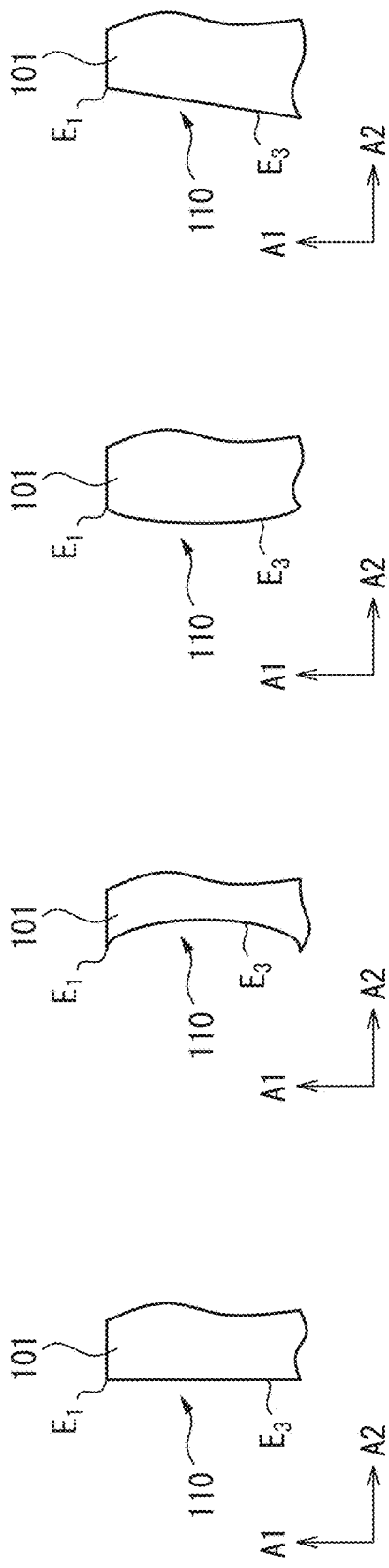
FIG. 8C
FIG. 8D
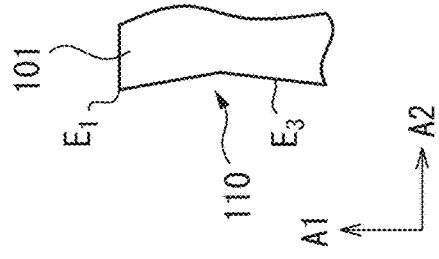
FIG. 8E
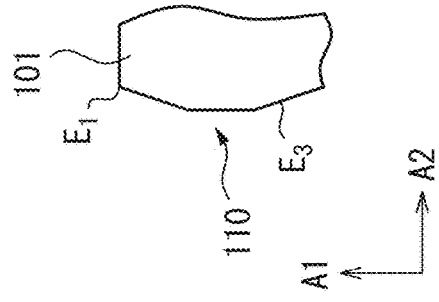
FIG. 8F
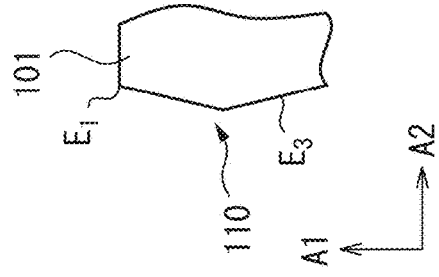
FIG. 8G
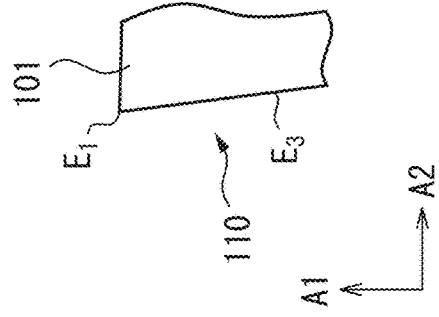
FIG. 8H

KEYBOARD APPARATUS IN WHICH TOUCH PAD IS LOCATED BASED ON FITTS'S LAW

CROSS-REFERENCE TO RELATED APPLICATIONS

This application is based upon and claims the benefit of priority of prior Japanese Patent Application No. 2023-097935, filed on Jun. 14, 2023, the entire contents of which are incorporated herein by reference.

TECHNICAL FIELD

Embodiments discussed in the present specification relate to keyboard apparatus.

BACKGROUND

Various types of keyboard apparatuses have been developed in recent years. It is desired that such keyboard apparatuses further improve the convenience of a user.

An input assistance means operation device provided with: a first-directional position operation input module located on a first edge formed at the intersection of an operation surface and a side face of an enclosure; and a second-directional position operation input module located on a second edge intersecting the first edge, is disclosed.

SUMMARY

According to some embodiments, a keyboard apparatus includes an enclosure, a plurality of keys located on a top face of the enclosure, and a touch pad provided on at least one side face of the enclosure. A shortest distance D between a key assigned to a home position out of the plurality of keys and an upper end of a side face on which the touch pad is provided, and a width W of the touch pad satisfy an equation below $$2 < \log_2\left(1 + D/W\right) < 6.$$

According to some embodiments, a keyboard apparatus includes an enclosure, a plurality of keys located on a top face of the enclosure, a mouse pointer located on a top face of the enclosure, and a touch pad provided on at least one side face of the enclosure. A shortest distance D between the mouse pointer and an upper end of a side face on which the touch pad is provided, and a width W of the touch pad satisfy an equation below $$2 < \log_2\left(1 + D/W\right) < 6.$$

BRIEF DESCRIPTION OF DRAWINGS

FIG. 8A is a schematic diagram for illustrating a shape of a part of a side face of a keyboard apparatus where the touch pad is located.

FIG. 8B is a schematic diagram for illustrating a shape of a part of a side face of a keyboard apparatus where the touch pad is located.

FIG. 8C is a schematic diagram for illustrating a shape of a part of a side face of a keyboard apparatus where the touch pad is located.

FIG. 8D is a schematic diagram for illustrating a shape of a part of a side face of a keyboard apparatus where the touch pad is located.

FIG. 8E is a schematic diagram for illustrating a shape of a part of a side face of a keyboard apparatus where the touch pad is located.

FIG. 8F is a schematic diagram for illustrating a shape of a part of a side face of a keyboard apparatus where the touch pad is located.

FIG. 8G is a schematic diagram for illustrating a shape of a part of a side face of a keyboard apparatus where the touch pad is located.

FIG. 8H is a schematic diagram for illustrating a shape of a part of a side face of a keyboard apparatus where the touch pad is located.

DESCRIPTION OF EMBODIMENTS

It is to be understood that both the foregoing general description and the following detailed description are exemplary and explanatory, and are not restrictive of the invention, as claimed.

Hereinafter, keyboard apparatus according to an embodiment, will be described with reference to the drawings. However, it should be noted that the technical scope of the invention is not limited to these embodiments, and extends to the inventions described in the claims and their equivalents.

Figure 1:
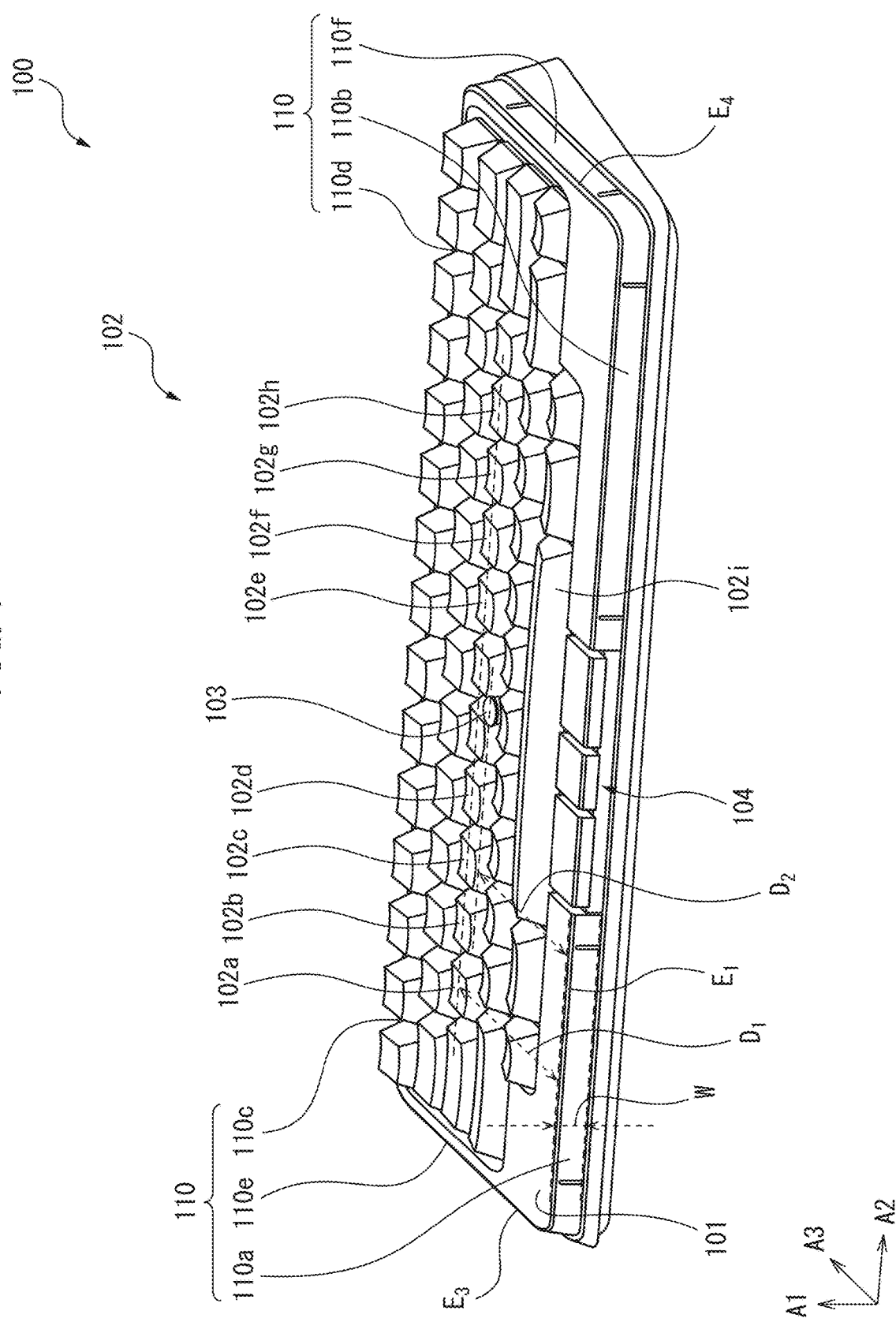
FIG. 1 is a perspective view illustrating a keyboard apparatus according to an embodiment.
Figure 2:
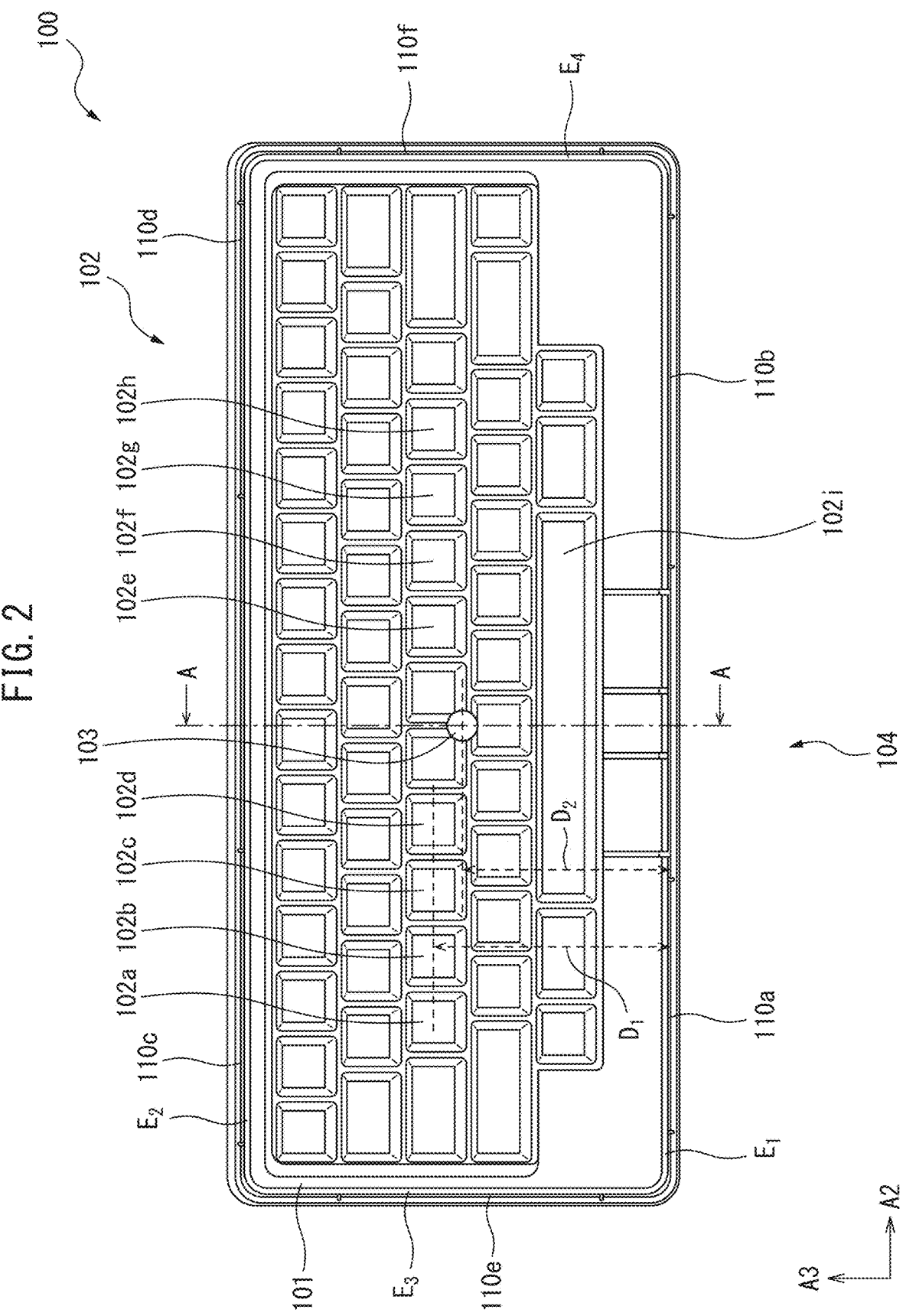
FIG. 2 is a top view of the keyboard apparatus.

FIG. 1 is a perspective view illustrating a keyboard apparatus according to an embodiment. FIG. 2 is a top view of the keyboard apparatus.

In FIG. 1 and FIG. 2, an arrow A1 indicates an almost vertical direction (the height direction of the keyboard apparatus 100), an arrow A2 indicates a longitudinal direction (the width direction) of the keyboard apparatus 100 perpendicular to the height direction, and an arrow A3 indicates a short direction (the depth direction) of the keyboard apparatus 100 perpendicular to the height direction and the width direction.

The keyboard apparatus 100 is a keyboard apparatus including main keys for inputting characters such as symbols or alphanumeric characters. The keyboard apparatus 100 may be a so-called numeric keypad device including numeric keys for inputting numerals. The keyboard apparatus 100 accepts an input operation by a user and outputs an operation signal according to the input operation by the user to an information processing apparatus (such as a personal computer or a mobile information terminal) electrically connected to the keyboard apparatus 100.

The keyboard apparatus 100 includes an enclosure 101, a plurality of keys 102, a mouse pointer 103, a plurality of mouse keys 104, and a plurality of touch pads 110. The number of touch pads 110 may be one. All of the plurality of keys 102, the mouse pointer 103, the plurality of mouse keys 104, and the plurality of touch pads 110 are provided in the enclosure 101.

The plurality of keys 102 are used for inputting characters such as symbols or alphanumeric characters. The plurality of keys 102 are located on the top face of the enclosure 101. Each key 102 includes a key top and a key switch. The plurality of keys 102 include keys 102a to 102h assigned to a home position. When the plurality of keys 102 are main keys, an A-key, an S-key, a D-key, an F-key, a J-key, a K-key, an L-key, and a "; (semicolon)" key are assigned to the home position. When the plurality of keys 102 are numeric keys, a 5-key is assigned to the home position.

The mouse pointer 103 is used for specifying an input position or a coordinate on a screen of a display device included in the information processing apparatus to which the keyboard apparatus 100 is connected. The mouse pointer 103 is located on the top face of the enclosure 101. The mouse pointer 103 is provided at a position based on the position of the mouse key 104 in consideration of an operation with the mouse key 104. For example, the mouse pointer 103 is provided at a position overlapping the mouse key 104 viewed from the depth direction A3, i.e., in the width direction A2. Further, the mouse pointer 103 is provided at a position overlapping the mouse key 104 viewed from the width direction A2, i.e., in the depth direction A3.

The mouse pointer 103 is located between the F-key 102d and the J-key 102e out of the plurality of keys 102. Consequently, a user can easily operate the mouse pointer 103 by using an index finger placed on the F-key 102d or the J-key 102e assigned to the home position. Accordingly, the keyboard apparatus 100 can improve the convenience of the user.

Each of the plurality of mouse keys 104 is a button, and functions similar to a left button, a right button, and a wheel button provided in a common three-button mouse may be assigned to the mouse keys 104, respectively. Other functions used in a common keyboard apparatus may be assigned to the plurality of mouse keys 104.

The plurality of mouse keys 104 are provided from the top face to the front side face of the enclosure 101. The mouse keys 104 are located between the keys 102a to 102h assigned to the home position out of the plurality of keys 102 and the touch pads 110a and 110b. Consequently, a user can easily operate the mouse key 104 with a thumb in a state of placing the index fingers, the middle fingers, the third fingers, and the little fingers on the keys 102a to 102h. Accordingly, the keyboard apparatus 100 can improve the convenience of the user.

Further, the mouse keys 104 are located between the mouse pointer 103 and the touch pads 110a and 110b. Consequently, a user can easily operate the mouse key 104 with a thumb while operating the mouse pointer 103 with an index finger. Accordingly, the keyboard apparatus 100 can improve the convenience of the user.

Each of the plurality of touch pads 110 can be assigned with a gesture function and outputs a signal according to an operation such as a swipe, a tap, a double tap, a press, or a long press. The plurality of touch pads 110 are used for performing, for example, vertical or horizontal scrolling, scaling up or down, or rotation on an object on a screen displayed on the display device included in the information processing apparatus to which the keyboard apparatus 100 is connected.

The plurality of touch pads 110 include touch pads 110a to 110f. The touch pads 110a and 110b are provided on the front side face of the enclosure 101. The touch pads 110c and 110d are provided on the back side face of the enclosure 101. The touch pad 110e is provided on the left side face of the enclosure 101. The touch pad 110f is provided on the right side face of the enclosure 101. Each touch pad 110 is provided along the extending direction of each side face. The touch pad 110 includes a sensor for detecting a touch by a user.

The shortest distance $D_1$ between the keys 102a to 102h assigned to the home position out of the plurality of keys 102 and upper ends $E_1$ to $E_4$ of the side faces on which the touch pads 110 are provided, and the width W of the touch pad 110 satisfy the following equation (1).

$$2 < \log_2(1 + D_1/W) < 6 \qquad (1)$$

The width W of the touch pad 110 is the length of an operation surface of the touch pad 110 in a short direction, i.e., the length of the touch pad 110 in the height direction A1.

The shortest distance $D_1$ is the distance in the depth direction A3 between the center position of key tops of the keys 102a to 102h assigned to the home position and the upper end $E_1$ of the front side face. The shortest distance $D_1$ may be the distance in the depth direction A3 between the front ends of the key tops of the keys 102a to 102h assigned to the home position, and the upper end $E_1$ of the front side face.

The shortest distance $D_1$ may be the distance in the depth direction A3 between the center position of the key tops of the keys 102a to 102h assigned to the home position and the upper end $E_2$ of the back side face. The shortest distance $D_1$ may be the distance in the depth direction A3 between the back ends of the key tops of the keys 102a to 102h assigned to the home position, and the upper end $E_2$ of the back side face.

The shortest distance $D_1$ may be the distance in the width direction A2 between the center position of the key top of the key 102a located most leftward out of the keys 102a to 102h assigned to the home position and the upper end $E_3$ of the left side face. The shortest distance $D_1$ may be the distance in the width direction A2 between the left end of the key top of the key 102a and the upper end $E_3$ of the left side face. The shortest distance $D_1$ may be the distance in the width direction A2 between the position of any key out of the keys 102a to 102h assigned to the home position and the upper end $E_3$ of the left side face.

The shortest distance $D_1$ may be the distance in the width direction A2 between the center position of the key top of the key 102h located most rightward out of the keys 102a to 102h assigned to the home position and the upper end $E_4$ of the right side face. The shortest distance $D_1$ may be the distance in the width direction A2 between the right end of the key top of the key 102h and the upper end $E_4$ of the right side face. The shortest distance $D_1$ may be the distance in the width direction A2 between the position of any key out of the keys 102a to 102h assigned to the home position and the upper end $E_4$ of the right side face.

In particular, the shortest distance $D_1$ and the width W more preferably satisfy the following equation (2).

$$2.2 < \log_2(1 + D_1/W) < 4.1 \qquad (2)$$

Fitts's law predicting that the time required for a target object to move to a region is a function of the distance to the target object and the size of the target object is known. Fitts's law is used for modeling an action of pointing at a certain point, i.e., physically touching a target object with a hand or a finger. Fitts's law indicates that the time T for completing the action is calculated by the following equation (3).

$$T = a + b\log_2(1 + D/W) \qquad (3)$$

Note that a denotes the time required for starting or stopping movement. Further, b denotes the moving speed. D denotes the distance from the start point to the center of the target. W denotes the width of the target object measured in the moving direction. The time a and the speed b are determined according to the conditions of the experiment. A logarithmic term $\log_2(1+D_1/W)$ in the equation (2) is referred to as an index of difficulty ID, and the time T for completing the action depends on the index of difficulty ID.

With regard to a keyboard apparatus provided with a touch pad on a side face, the inventor has performed an experiment of causing a plurality of users to move a finger placed on a home position of a key to the position of the touch pad while varying the distance between the home position of the key and the touch pad and the width of the touch pad with the home position as a start point and the width of the touch pad as the width of a target object.

Figure 3:
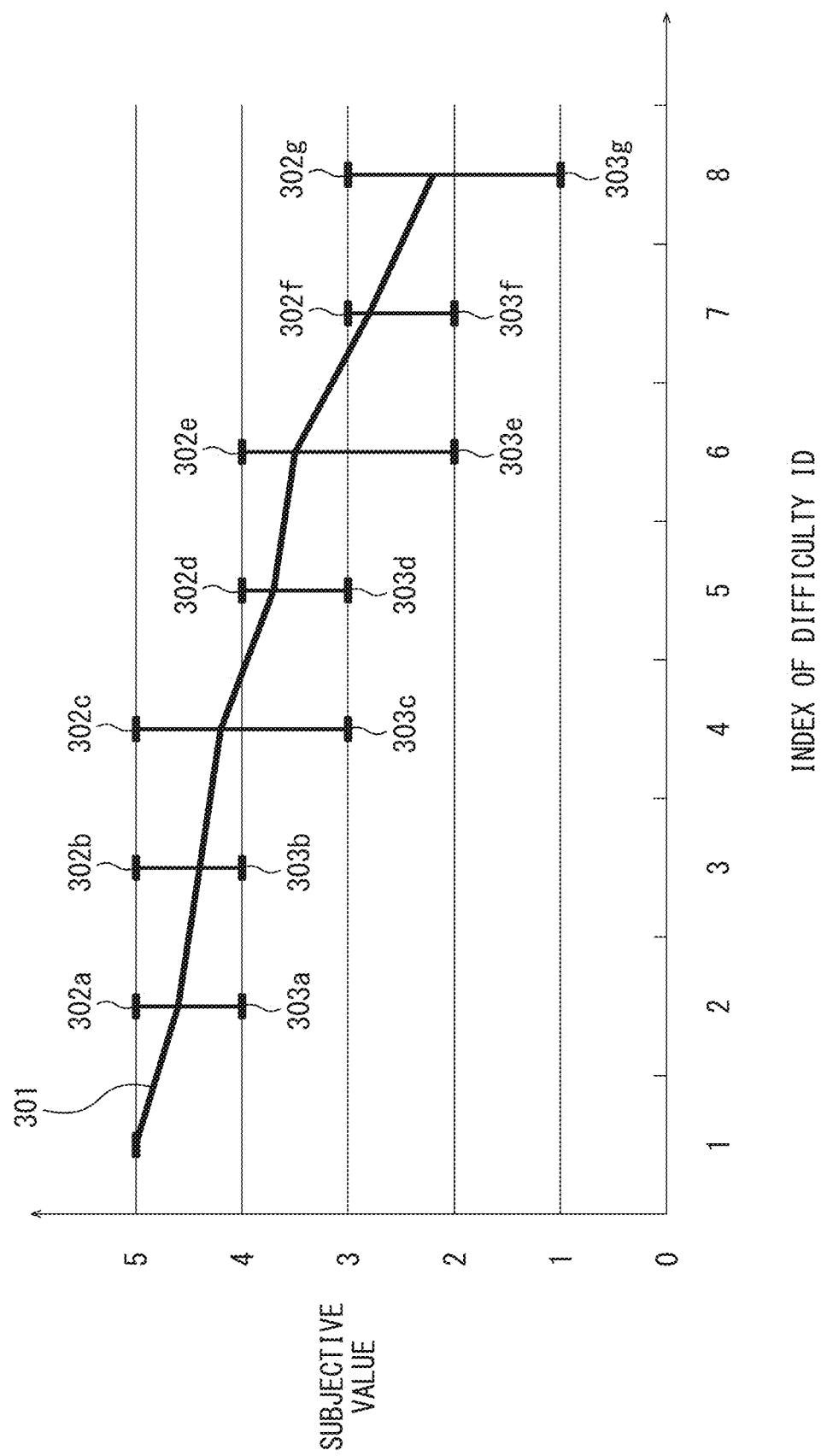
FIG. 3 is a graph for illustrating an experimental result.

FIG. 3 is a graph for illustrating the result of the aforementioned experiment.

In FIG. 3, the horizontal axis indicates an index of difficulty ID, and the vertical axis indicates a subjective value of operational comfortability by a user. A subjective value takes on a five-step value, i.e., 1 indicating being very uncomfortable, 2 indicating being uncomfortable, 3 indicating being normal, 4 indicating being comfortable, and 5 indicating being very comfortable. A graph 301 in FIG. 3 is a graph illustrating a relation between an index of difficulty ID of each key and the mean value of subjective values by a plurality of users in the aforementioned experiment. Each of lines 302a to 302g positioned above the graph 301 represents the maximum value of the subjective values by the users of an index of difficulty ID for each key 102, and each of lines 303a to 303g positioned below the graph 301 represents the minimum value of the subjective values by the users of an index of difficulty ID for each key 102. As illustrated in FIG. 3, when an index of difficulty ID is less than 6, subjective values by the users are equal to or greater than 3 indicating being normal, and none of the users were dissatisfied with operability. On the other hand, in order to suitably locate a key between the home position and the touch pad, an index of difficulty ID is preferably at least greater than 2. Accordingly, when the aforementioned equation (1) is satisfied, the keyboard apparatus can improve operability for a user while suitably locating keys.

Further, as illustrated in FIG. 3, when an index of difficulty ID is less than 4.1, the mean value of subjective values by the users are equal to or greater than 4 indicating being comfortable. Further, in order to locate keys with a margin between the home position and the touch pad such that a user can comfortably perform key typing, an index of difficulty ID is preferably greater than 2.2. Accordingly, when the touch pad is located such that the aforementioned equation (2) is satisfied, the keyboard apparatus can further improve operability for a user while suitably locating a plurality of keys.

In particular, when the touch pad 110 is located on the front side face or the back side face of the enclosure 101, the touch pad 110 is located at a position allowing an easy operation for all of the index finger, the middle finger, the third finger, and the little finger that operate keys 102.

In the aforementioned equations (1) and (2), the shortest distance between the keys 102a to 102h assigned to the home position and the upper end of each touch pad 110 (a Euclidean distance) may be used in place of the shortest distance $D_1$. Further, in the aforementioned equations (1) and (2), a distance acquired by adding the distances between the upper ends $E_1$ to $E_4$ and the upper ends of the respective touch pads 110 to the shortest distance $D_1$ may be used in place of the shortest distance $D_1$.

Further, the shortest distance $D_2$ between the mouse pointer 103 and the upper ends $E_1$ to $E_4$ of the side faces on which the touch pads 110 are provided, and the width W of the touch pad 110 satisfy the following equation (4).

$$2 < \log_2(1 + D_2/W) < 6 \qquad (4)$$

The shortest distance $D_2$ is the distance in the depth direction A3 between the center position of the mouse pointer 103 and the upper end $E_1$ of the front side face. The shortest distance $D_2$ may be the distance in the depth direction A3 between the front end of the mouse pointer 103 and the upper end $E_1$ of the front side face.

The shortest distance $D_2$ may be the distance in the depth direction A3 between the center position of the mouse pointer 103 and the upper end $E_2$ of the back side face, the upper end $E_3$ of the left side face, or the upper end $E_4$ of the right side face. The shortest distance $D_2$ may be the distance in the depth direction between the back end of the mouse pointer 103 and the upper end $E_2$ of the back side face, the distance in the depth direction A3 between the left end and the upper end $E_3$ of the left side face, or the distance in the depth direction between the right end and the upper end $E_4$ of the right side face.

Similarly to the positional relation between the home position and the touch pad 110, when the touch pad 110 is located relative to the mouse pointer 103 such that the aforementioned equation (4) is satisfied, the keyboard apparatus 100 can improve operability for a user while suitably locating the plurality of keys 102.

In particular, the shortest distance $D_2$ and the width W more preferably satisfy the following equation (5).

$$2.2 < \log_2(1 + D_2/W) < 4.1 \qquad (5)$$

Similarly to the positional relation between the home position and the touch pad 110, when the touch pad 110 is located relative to the mouse pointer 103 such that the aforementioned equation (5) is satisfied, the keyboard apparatus 100 can further improve operability for a user while more suitably locating the plurality of keys 102.

In the aforementioned equations (4) and (5), the shortest distance between the mouse pointer 103 and the upper end of the touch pad 110 (a Euclidean distance) may be used in place of the shortest distance $D_2$. Further, a distance acquired by adding the distances between the upper ends $E_1$ to $E_4$ and the upper ends of the respective touch pads 110 to the shortest distance $D_2$ may be used in place of the shortest distance $D_2$.

Further, in consideration of the size of the entire keyboard apparatus 100, each of the distances $D_1$ and $D_2$ is preferably equal to or less than 300 mm. Further, in consideration of the size of the entire touch pad 110, the width W of the touch pad 110 preferably falls within a range of equal to or greater than 1 mm and less than 50 mm.

Further, the plurality of keys 102 include a space key 102*i*. The shortest distance between the space key 102*i* and the upper end $E_1$ of the front side face of the enclosure 101 on which the touch pads 110*a* and 110*b* are provided is preferably equal to or less than 55.1 mm. The shortest distance between the space key 102*i* and the upper end $E_1$ of the front side face of the enclosure 101 on which the touch pads 110*a* and 110*b* are provided is more preferably equal to or less than 37.7 mm. The shortest distance between the space key 102*i* and the upper end $E_1$ is the distance in the depth direction A3 from the center position of the key top of the space key 102*i* to the upper end $E_1$. The shortest distance between the space key 102*i* and the upper end $E_1$ may be the distance in the depth direction A3 from the front end of the key top of the space key 102*i* to the upper end $E_1$.

In the keyboard apparatus 100, the mouse keys 104 are located between the space key 102*i* and the upper end $E_1$ of the front side face of the enclosure 101 on which the touch pads 110*a* and 110*b* are provided. On the other hand, according to a research result by the Artificial Intelligence Research Center (https://www.airc.aist.go.jp/dhrt/hand/data/list.html), the mean value of the dorsal length of a first finger (thumb) of a Japanese is 53.4 mm, the minimum value is 43.5 mm, and the maximum value is 63.6 mm. Further, an angle of a thumb movable relative to an index finger (an angle of the extending direction of the thumb relative to the extending direction of the index finger) falls within a range of 30° to 90°.

Figure 4:
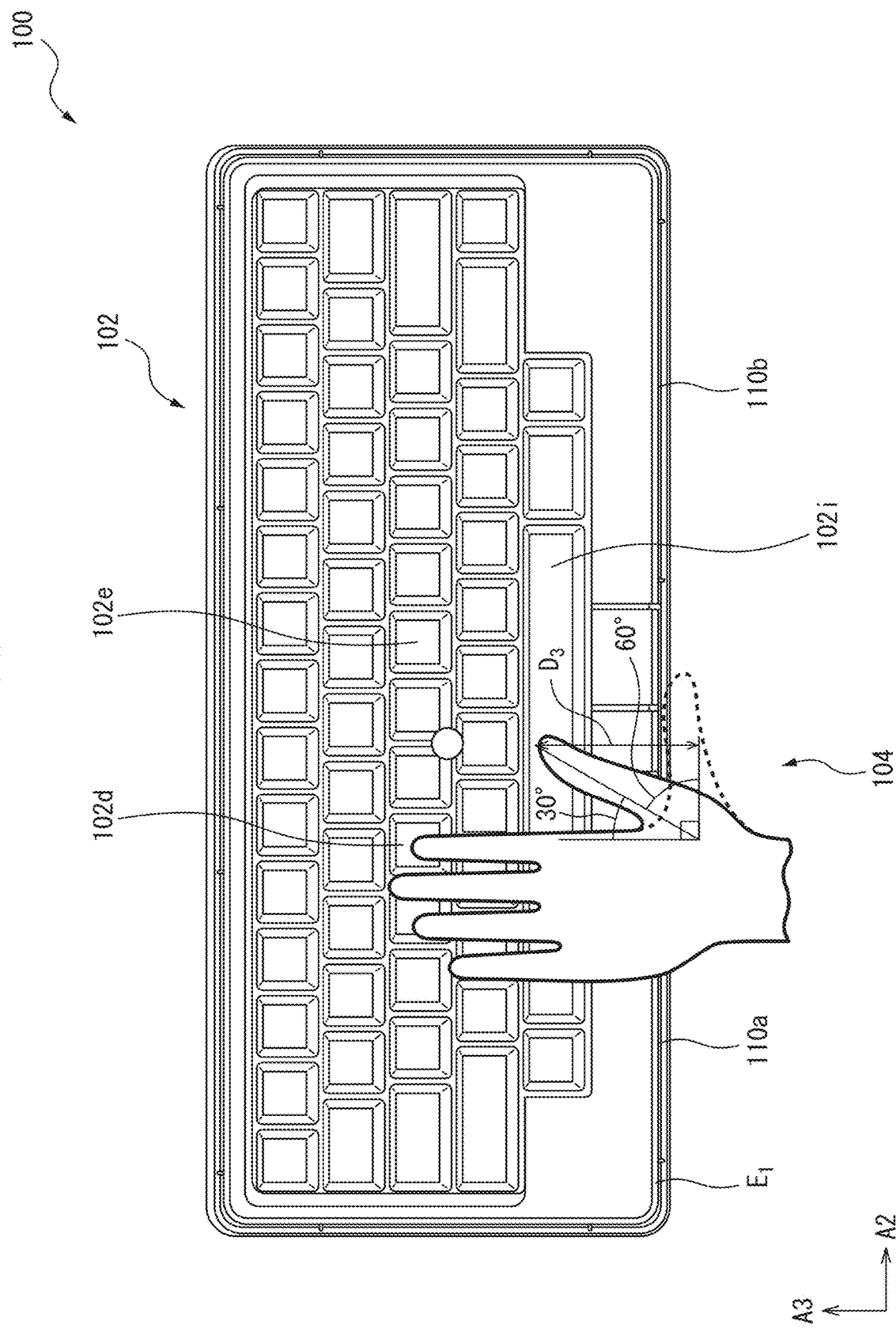
FIG. 4 is a schematic diagram illustrating a relation between a space key and a touch pad, and a finger of a user.

FIG. 4 is a schematic diagram illustrating a relation between the space key and the touch pads, and fingers of a user.

In order to improve operability for a user, it is preferable that a thumb can operate both the space key 102*i* and the touch pads 110*a* and 110*b* without moving an index finger from the F-key 102*d* or the J-key 102*e*. When an angle of a thumb positioned on the space key 102*i* relative to an index finger is 30° and an angle of the thumb positioned on the touch pad 110*a* relative to the index finger is 90° as illustrated in FIG. 4, the distance $D_3$ between the positions of the thumb is a value acquired by multiplying the length of the thumb by sin (60°). Accordingly, in order to enable a thumb with a length of 43.5 mm to operate both the space key 102*i* and the touch pads 110*a* and 110*b* without moving an index finger from the F-key 102*d* or the J-key 102*e*, the distance between the space key 102*i* and the upper end $E_1$ is preferably equal to or less than 37.7 mm. Further, in order to enable a thumb with a length of 63.6 mm to operate both the space key 102*i* and the touch pads 110*a* and 110*b* without moving an index finger from the F-key 102*d* or the J-key 102*e*, the distance between the space key 102*i* and the upper end $E_1$ is preferably equal to or less than 55.1 mm.

In other words, when the distance between the space key 102*i* and the upper end $E_1$ of the front side face of the enclosure 101 is equal to or less than 55.1 mm, a user with a thumb with a length of 63.6 mm can operate the space key 102*i* and the touch pads 110*a* and 110*b* with the thumb without moving an index finger from the F-key 102*d* or the J-key 102*e*. Further, by setting the distance between the space key 102*i* and the upper end $E_1$ of the front side face of the enclosure 101 to equal to or less than 37.7 mm, a user with a short thumb can operate the space key 102*i* and the touch pads 110*a* and 110*b* with the thumb without moving an index finger from the F-key 102*d* or the J-key 102*e*. Accordingly, the keyboard apparatus 100 can improve operability for a user while locating the mouse key 104 between the space key 102*i* and the front side face of the enclosure 101.

Figure 5:
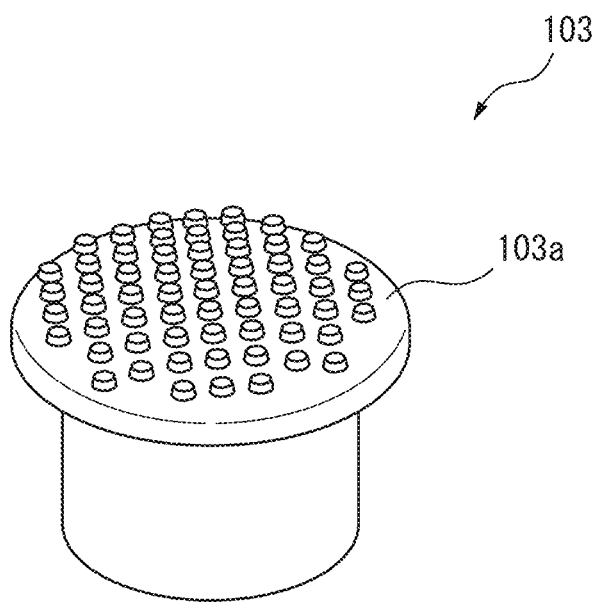
FIG. 5 is a schematic diagram for illustrating a cover of a mouse pointer.

FIG. 5 is a schematic diagram for illustrating a cover of the mouse pointer.

As illustrated in FIG. 5, the mouse pointer 103 includes the cover 103*a* provided attachably and detachably. By the cover 103*a* being attachably and detachably provided, the mouse pointer 103 allows easy replacement of the cover 103*a* and change of the material of the surface (such as rubber with varied hardness) and/or the shape (such as an uneven shape). A user can change the cover 103*a* of the mouse pointer 103 according to user preference, and the keyboard apparatus 100 can improve the convenience of the user.

Figure 6:
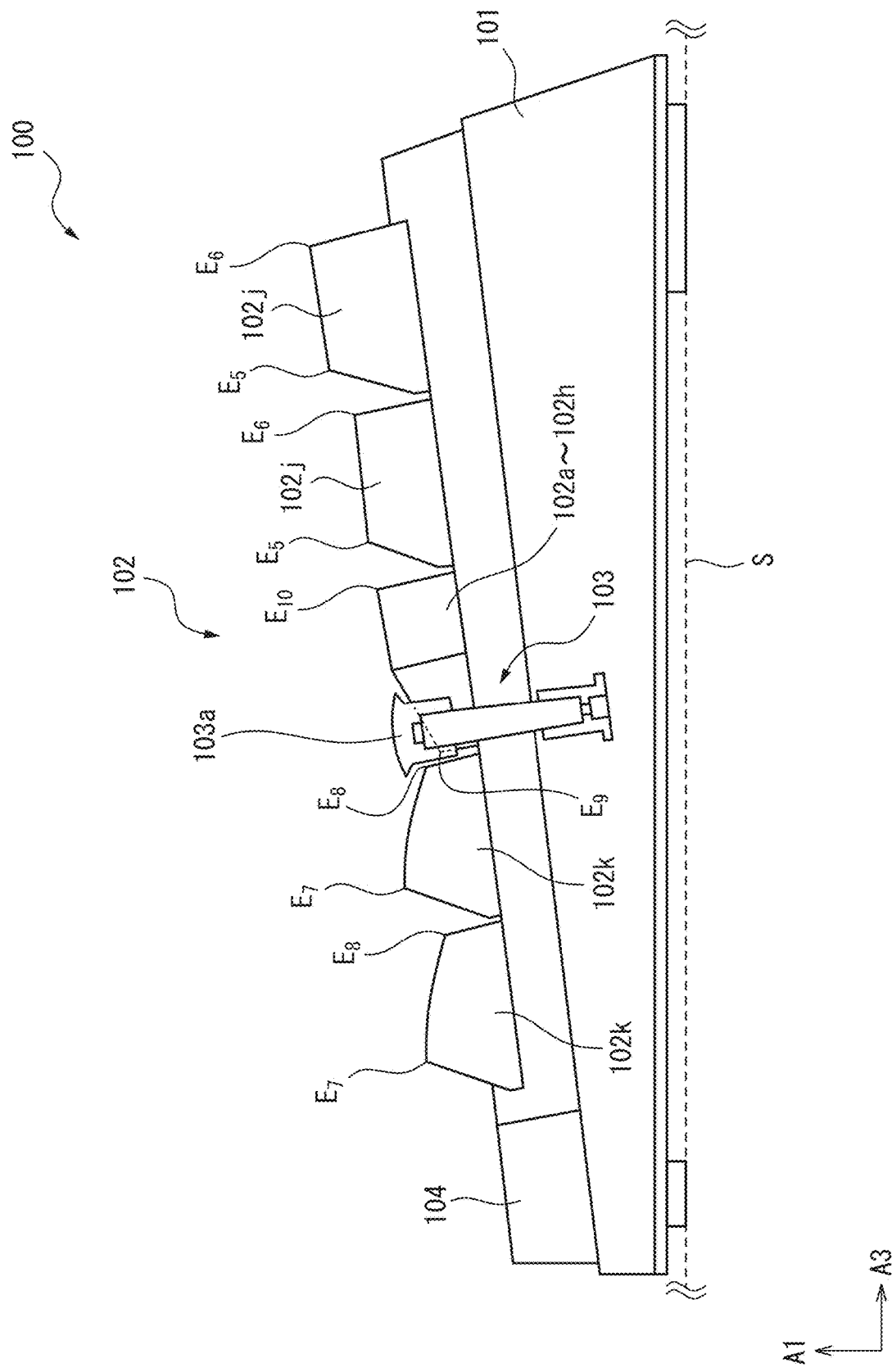
FIG. 6 is an A-A cross-sectional view of the keyboard apparatus illustrated in FIG. 2.

FIG. 6 is an A-A cross-sectional view of the keyboard apparatus illustrated in FIG. 2.

As illustrated in FIG. 6, the height of a front end $E_5$ of the top face of each key 102*j* located on the back side of the keys 102*a* to 102*h* assigned to the home position out of the plurality of keys 102 is less than the height of a back end $E_6$ of the top face of the key 102*j* on the basis of a placement surface S of the keyboard apparatus 100. Because the top face of each key 102*j* located on the back side from the keys assigned to the home position is inclined to orient frontward, a finger of a user can smoothly touch the top face of the key 102*j* when moving from the keys 102*a* to 102*h* assigned to the home position to the key 102*j*. Further, the height of a front end $E_7$ of the top face of each key 102*k* located on the front side of the keys 102*a* to 102*h* assigned to the home position is greater than the height of a back end $E_8$ of the top face of the key 102*k* on the basis of the placement surface S of the keyboard apparatus 100. Because the top face of each key 102*k* located on the front side from the keys assigned to the home position is inclined to orient backward, a finger of the user can smoothly touch the top face of the key 102*k* when moving from the keys 102*a* to 102*h* assigned to the home position to the key 102k. Accordingly, the keyboard apparatus 100 can improve the convenience of the user.

Further, on the basis of the placement surface S of the keyboard apparatus 100, the heights of a front end $E_9$ and $E_5$ of the respective keys 102a to 102h and 102j that are located on the back side of the mouse pointer 103 out of the plurality of keys 102 are respectively less than the heights of back ends $E_{10}$ and $E_6$ of the respective top faces of the keys 102a to 102h and 102j. Because the top faces of each of the keys 102a to 102h and 102j that are located on the back side are inclined to orient frontward, a finger of the user can smoothly touch the top face of the each of the keys 102a to 102h and 102j when moving from the mouse pointer 103 to the each of the keys 102a to 102h and 102j. Further, on the basis of the placement surface S of the keyboard apparatus 100, the height of a front end $E_7$ of the top face of each key 102k located on the front side of the mouse pointer 103 is greater than the height of a back end $E_8$ of the top face of the key 102k. Because the top faces of each key 102k located on the front side are inclined to orient backward, a finger of the user can smoothly touch the top face of the key 102k when moving from the mouse pointer 103 to the key 102k. Consequently, when operating the mouse pointer 103 after operating the key 102j and the key 102k, a finger of the user is less likely to touch the key 102j and the key 102k, and therefore the user can smoothly operate the mouse pointer 103. Accordingly, the keyboard apparatus 100 can improve the convenience of the user.

Figure 7A:
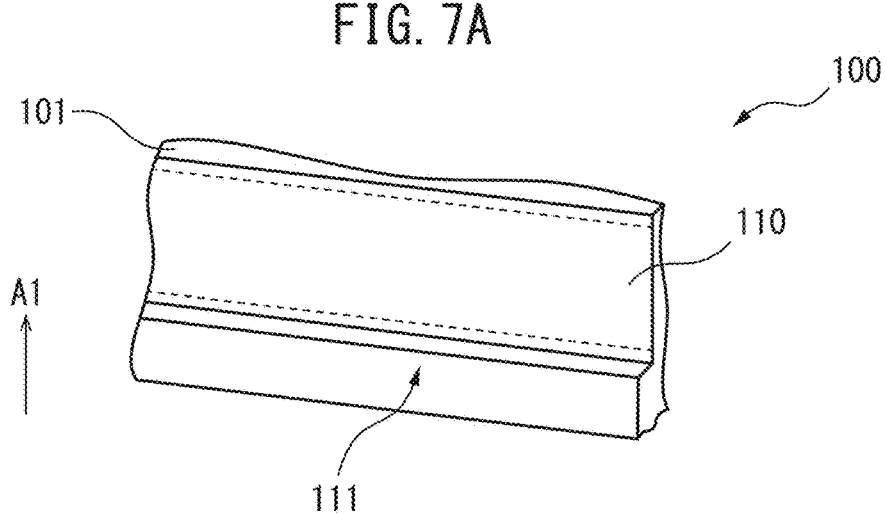
FIG. 7A is a schematic diagram for illustrating a shape of a side face of a keyboard apparatus.
Figure 7B:
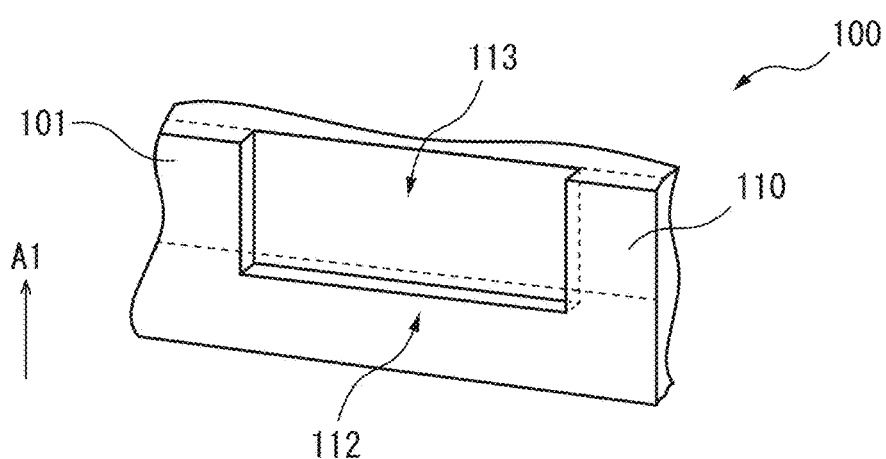
FIG. 7B is a schematic diagram for illustrating a shape of a side face of a keyboard apparatus.
Figure 7C:
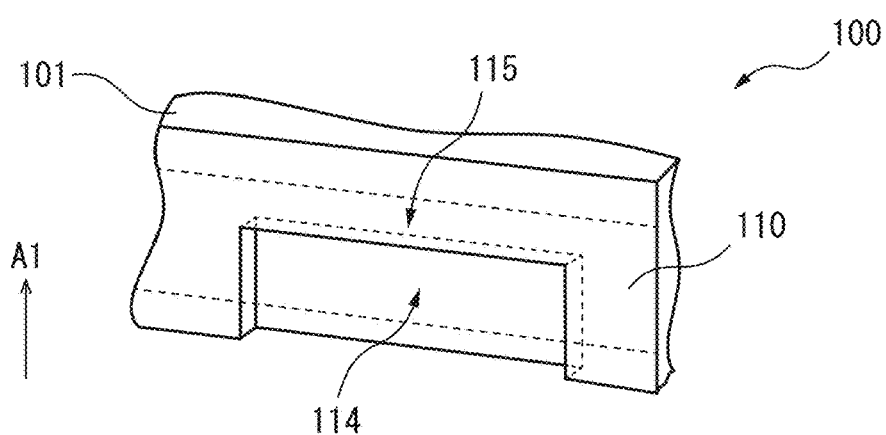
FIG. 7C is a schematic diagram for illustrating a shape of a side face of a keyboard apparatus.

FIGS. 7A to 7C are schematic diagrams for illustrating shapes of a side face of the keyboard apparatus.

A part on a side face of the keyboard apparatus 100 where a touch pad 110 is located is located on the inside (the center side) of the keyboard apparatus 100 relative to a part where the touch pad 110 is not located. For example, the touch pad 110 is located in the upper region of a side face of the keyboard apparatus 100 in the height direction A1 as illustrated in FIG. 7A. A guide part 111 extending along the extending direction of the side face of the keyboard apparatus 100 and protruding outward from the touch pad 110 is provided below the touch pad 110. The guide part 111 is formed to extend across both ends of the side face of the keyboard apparatus 100 in the extending direction. The guide part 111 is formed at any position, such as the center position, the upper position, or the lower position, of the side face of the keyboard apparatus 100 in the height direction A1.

A guide part 112 may be formed in place of the guide part 111 as illustrated in FIG. 7B. The guide part 112 is formed to protrude outward from the touch pad 110, similarly to the guide part 111. However, the guide part 112 does not reach both ends of the side face in the extending direction while extending along the extending direction of a side face of the keyboard apparatus 100 in the lower part of the touch pad 110. Further, the guide part 112 is formed to extend upward at positions of both ends of the touch pad 110 in the extending direction of the side face and reach the upper end of the side face. A recessed part 113 is formed on the side face of the keyboard apparatus 100 by the guide part 112. A part of the guide part 112 extending along the extending direction of the side face of the keyboard apparatus 100 is formed at any position, such as the center position, the upper position, or the lower position, of the side face of the keyboard apparatus 100 in the height direction A1. The recessed part 113 is formed at any position, such as the center position or a position close to one end, of the side face of the keyboard apparatus 100 in the extending direction of the side face.

As illustrated in FIG. 7C, the touch pad 110 may be located in the lower region of a side face of the keyboard apparatus 100 in the height direction A1. In that case, a guide part 114 may be formed in place of the guide part 112. The guide part 114 is formed to protrude outward from the touch pad 110, similarly to the guide part 112. However, the guide part 114 does not reach both ends of the side face in the extending direction while extending along the extending direction of the side face of the keyboard apparatus 100 above the touch pad 110. Further, the guide part 115 is formed to extend downward at the positions of both ends of the touch pad 110 in the extending direction of the side face and reach the lower end of the side face. A recessed part 114 is formed on the side face of the keyboard apparatus 100 by the guide part 115. A part of the guide part 115 extending along the extending direction of the side face of the keyboard apparatus 100 is formed at any position, such as the center position, the upper position, or the lower position, of the side face of the keyboard apparatus 100 in the height direction A1. The recessed part 114 is formed at any position, such as the center position or a position close to one end, of the side face in the extending direction of the side face of the keyboard apparatus 100. A guide part formed to extend along the extending direction of a side face of the keyboard apparatus 100 and extend across both ends of the side face of the keyboard apparatus 100 in the extending direction above the touch pad 110 may be provided in place of the guide part 115.

By formation of a guide part, the keyboard apparatus 100 can cause a user to clearly recognize the position of an operation region of the touch pad 110 and can improve operability for the user. Further, by formation of a recessed part, the keyboard apparatus 100 can suppress a user unintentionally touching the touch pad 110 by mistake. In particular, by opening the upper end or the lower end of the recessed part where the touch pad 110 is located, the user can easily touch the touch pad 110, and the keyboard apparatus 100 can improve operability for a user.

FIGS. 8A to 8H are schematic diagrams for illustrating shapes of a part of a side face of the keyboard apparatus where the touch pad is located.

A part of a side face of the keyboard apparatus 100 where the touch pad 110 is located has a planar shape extending along the height direction A1, as illustrated in FIG. 8A. The part where the touch pad 110 is located may have a curved shape the central part of which in the height direction A1 curves to project inward in the width direction A2, as illustrated in FIG. 8B. Further, the part where the touch pad 110 is located may have a curved shape the central part of which in the height direction A1 curves to project outward in the width direction A2, as illustrated in FIG. 8C. Further, the part where the touch pad 110 is located may have a planar shape extending such that the lower side of the part in the height direction A1 is positioned outside in the width direction A2 from the upper side in the height direction A1, as illustrated in FIG. 8D. Further, the part where the touch pad 110 is located may have a planar shape extending such that the upper side in the height direction A1 is positioned outside in the width direction A2 from the lower side in the height direction A1, as illustrated in FIG. 8E. Further, the part where the touch pad 110 is located may have a bent shape extending such that the central part in the height direction A1 is positioned inside in the width direction A2 from the upper side and the lower side, as illustrated in FIG.

8F. Further, the part where the touch pad 110 is located may have a bent shape formed of three planes such that the central part in the height direction A1 is positioned outside in the width direction A2 from the upper side and the lower side, and the central part in the height direction A1 extends along the height direction A1, as illustrated in FIG. 8G. Further, the part where the touch pad 110 is located may have a bent shape extending such that the central part in the height direction A1 is positioned inside in the width direction A2 from the upper side and the lower side, as illustrated in FIG. 8H. Further, the part where the touch pad 110 is located may have a bent shape formed of three planes such that the central part in the height direction A1 is positioned inside in the width direction A2 from the upper side and the lower side, and the central part in the height direction A1 extends along the height direction A1.

Figure 9:
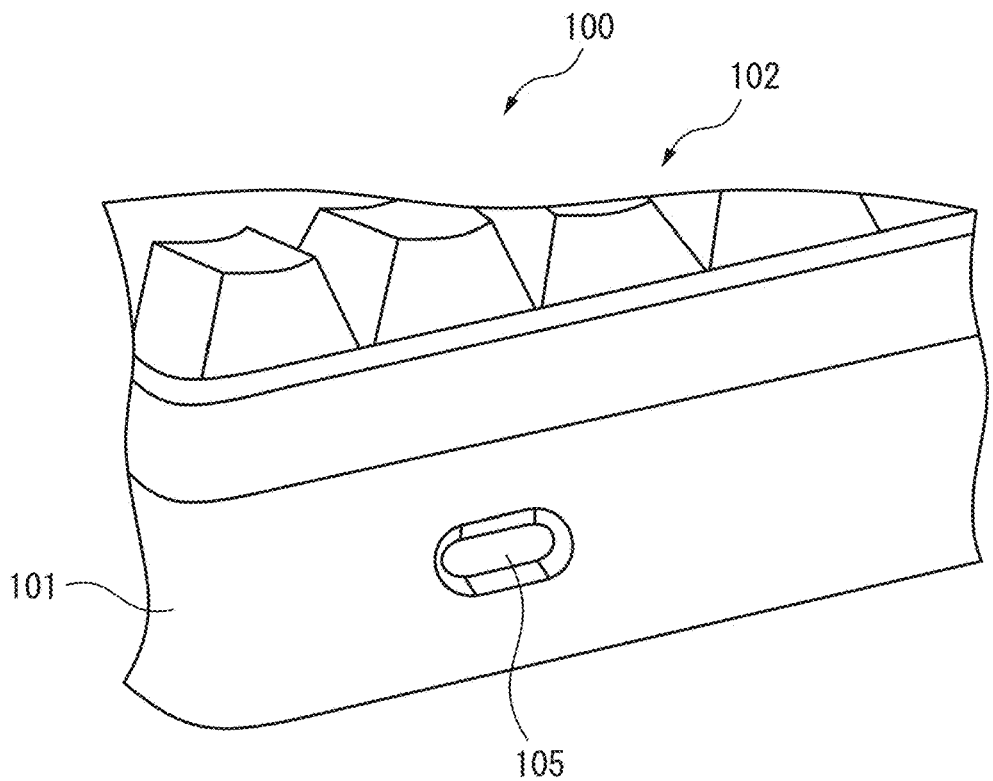
FIG. 9 is a perspective view illustrating a switch provided in the keyboard apparatus.

FIG. 9 is a perspective view illustrating a switch provided in the keyboard apparatus.

As illustrated in FIG. 9, the keyboard apparatus 100 is provided with the switch 105. For example, the switch 105 is provided on a side face of the keyboard apparatus 100. The switch 105 has a function of switching between validation and invalidation of an operation on at least one of the mouse pointer 103, the mouse key 104, and the touch pad 110. Consequently, the keyboard apparatus 100 can invalidate an operation on at least one of the mouse pointer 103, the mouse key 104, and the touch pad 110 according to a user demand and can suppress occurrence of an operation error by the user. The keyboard apparatus 100 may be provided with a plurality of switches 105 each of which is associated with one of the mouse pointer 103, the mouse key 104, and the touch pad 110, respectively. Further, the keyboard apparatus 100 may invalidate an operation on one of the mouse pointer 103, the mouse key 104, and the touch pad 110 depending on the number of depressions of the switch 105. Further, the keyboard apparatus 100 may invalidate operations on all of the mouse pointer 103, the mouse key 104, and the touch pad 110 with one switch.

Figure 10:
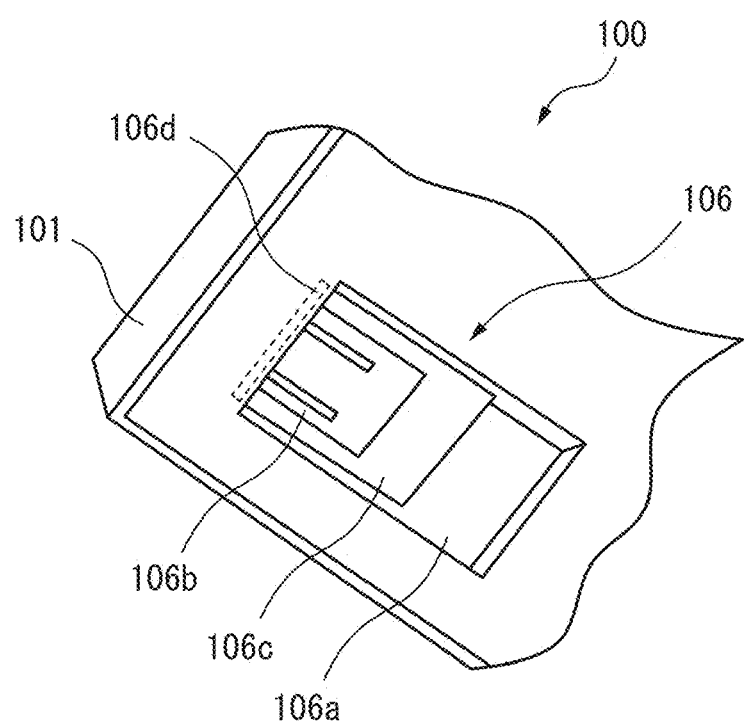
FIG. 10 is a perspective view illustrating an angle switching part in the keyboard apparatus.

FIG. 10 is a perspective view illustrating an angle switching part in the keyboard apparatus.

As illustrated in FIG. 10, the keyboard apparatus 100 is provided with the angle switching parts 106. For example, the angle switching parts 106 are provided on the bottom face of the keyboard apparatus 100 around the right back corner and the left back corner of the keyboard apparatus 100, respectively. The angle switching parts 106 are provided to be able to change the inclination of the top face of the enclosure 101 of the keyboard apparatus 100 relative to the placement surface S. The angle switching part 106 includes a storage part 106a, a first angle adjustment part 106b, and a second angle adjustment part 106c. Ends of the first angle adjustment part 106b and the second angle adjustment part 106c on the back side are supported by the enclosure 101 to be rotatable around a rotation shaft 106d.

Figure 11A:
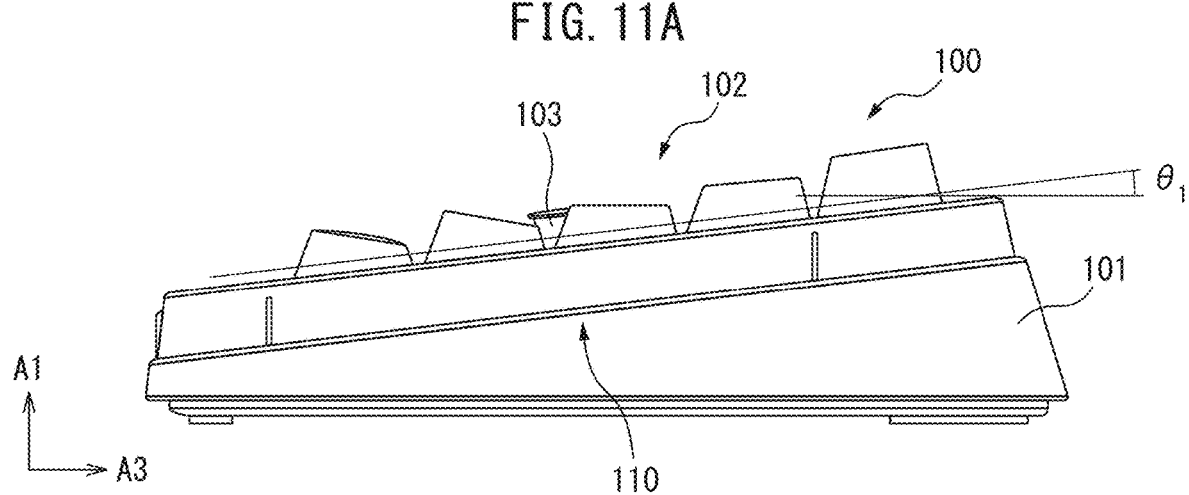
FIG. 11A is a diagram illustrating the keyboard apparatus with the angle switching part being retracted.
Figure 11B:
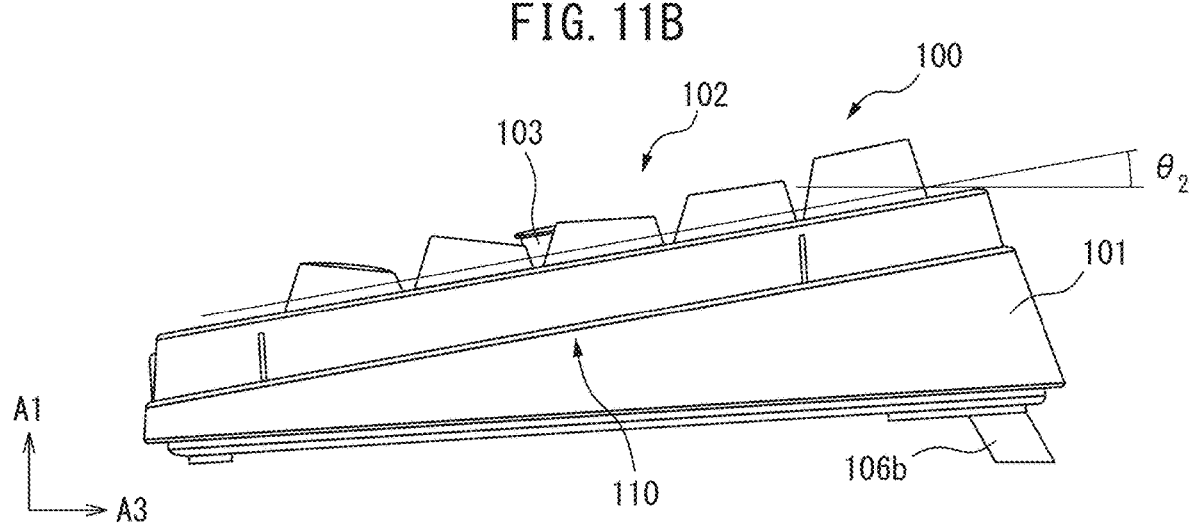
FIG. 11B is a diagram illustrating the keyboard apparatus with a first angle adjustment part being unfolded.
Figure 11C:
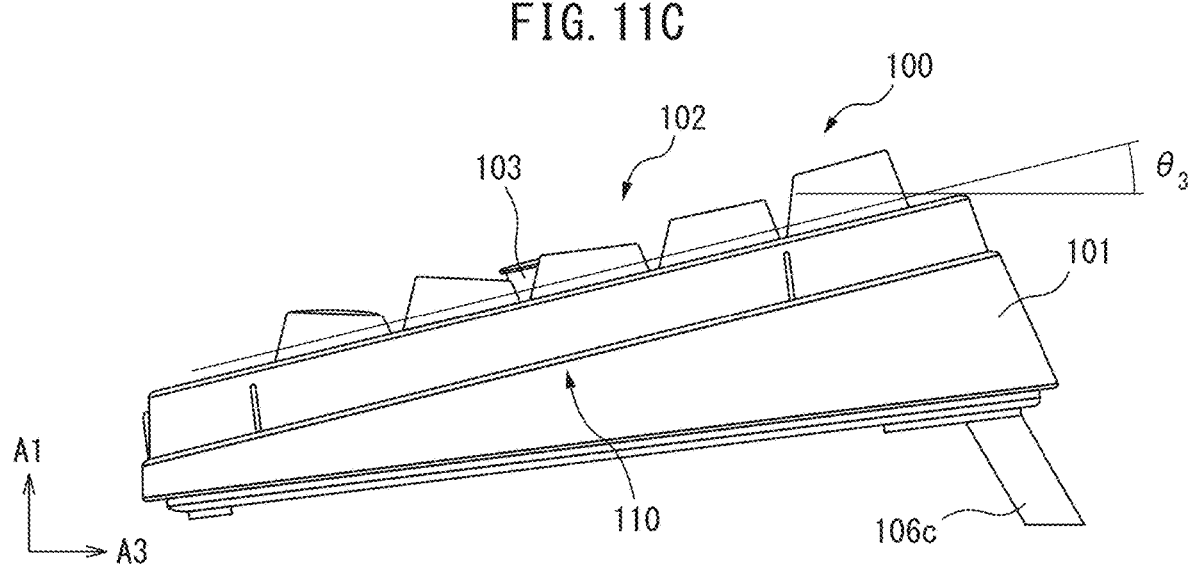
FIG. 11C is a diagram illustrating the keyboard apparatus with a second angle adjustment part being unfolded.

FIG. 11A is a diagram illustrating the keyboard apparatus with the angle switching part being retracted, FIG. 11B is a diagram illustrating the keyboard apparatus with the first angle adjustment part being unfolded, and FIG. 11C is a diagram illustrating the keyboard apparatus with the second angle adjustment part being unfolded.

When the angle switching part 106 is retracted, the angle of the top face of the enclosure 101 is $\theta_1$, as illustrated in FIG. 11A. When the first angle adjustment part 106b is unfolded, the angle of the top face of the enclosure 101 is $\theta_2$, which is greater than $\theta_1$, as illustrated in FIG. 11B. Further, when the second angle adjustment part 106c is unfolded, the angle of the top face of the enclosure 101 is $\theta_3$, which is greater than $\theta_2$, as illustrated in FIG. 11C. Note that $\theta_3$ falls within a range of equal to or greater than 15° and equal to or less than 25° and is preferably 20°. Consequently, a user can operate the keys 102, the mouse pointer 103, the mouse keys 104, and the touch pads 110 at a preferred angle. Accordingly, the keyboard apparatus 100 can improve the convenience of the user.

Figure 12A:
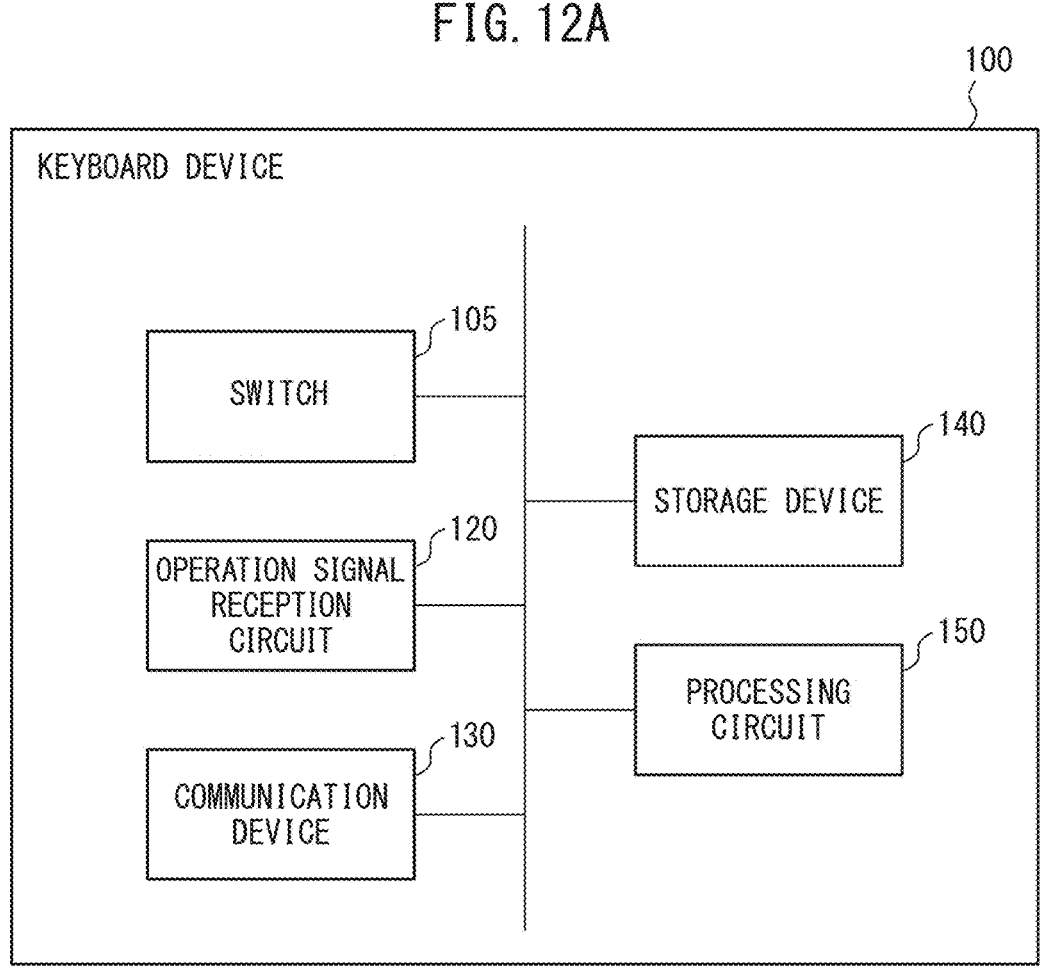
FIG. 12A is a block diagram illustrating a schematic configuration of the keyboard apparatus.

FIG. 12A is a block diagram illustrating a schematic configuration of the keyboard apparatus. The keyboard apparatus 100 further includes an operation signal reception circuit 120, a communication device 130, a storage device 140, a processing circuit 150, etc., in addition to the aforementioned configuration.

The operation signal reception circuit 120 acquires an operation signal corresponding to an input operation by a user outputted from each of the plurality of keys 102, the plurality of mouse keys 104, the mouse pointer 103, and the plurality of touch pads 110, and transmits the operation signal to the processing circuit 150.

The communication device 130 functions as a communication module communicable with an information processing apparatus. The communication device 130 includes an antenna transmitting and receiving wireless signals, and a wireless communication interface circuit for transmitting and receiving signals to and from the information processing apparatus through a wireless communication line compatible with a predetermined communication protocol. For example, the predetermined communication protocol is a wireless communication protocol using Bluetooth (registered trademark) or IEEE (Institute of Electrical and Electronics Engineers) 802.15. Further, for example, the keyboard apparatus 100 may include an interface circuit conforming to a serial bus such as USB (Universal Serial Bus) in place of the communication device 130, be connected to the information processing apparatus in a wired manner, and transmit and receive signals.

The storage device 140 functions as a storage module. The storage device 140 includes memory devices, such as a random-access memory (RAM) and a read-only memory (ROM), etc. Further, a computer program, a database, a table, etc., that are used in various types of processing in the keyboard apparatus 100 are stored in the storage device 140. The computer programs may be installed on the storage device 140 from a computer-readable, non-transitory medium such as a Compact Disc ROM (CD-ROM), Digital Versatile Disc ROM (DVD-ROM), etc., by using a well-known setup program etc. The computer programs may be installed on the storage device 140 from a server, etc.

The processing circuit 150 functions as a control module. The processing circuit 150 operates in accordance with a program prestored in the storage device 140. For example, the processing circuit 150 is a central processing module (CPU). For example, a digital signal processor (DSP), a large-scale integration (LSI), an application specific integrated circuit (ASIC), or a field-programmable gate array (FPGA) may be used as the processing circuit 150. The processing circuit 150 is connected to the operation signal reception circuit 120, the communication device 130, the storage device 140, etc., and controls the components. The processing circuit 150 acquires an operation signal from each of the plurality of keys 102, the plurality of mouse keys 104, the mouse pointer 103, and the plurality of touch pads 110 through the operation signal reception circuit 120. The processing circuit 150 converts the acquired operation signal into an electric signal that can be output from the communication device 130 and be processed by the information processing apparatus and transmits the electric signal to the information processing apparatus through the communication device 130.

Figure 12B:
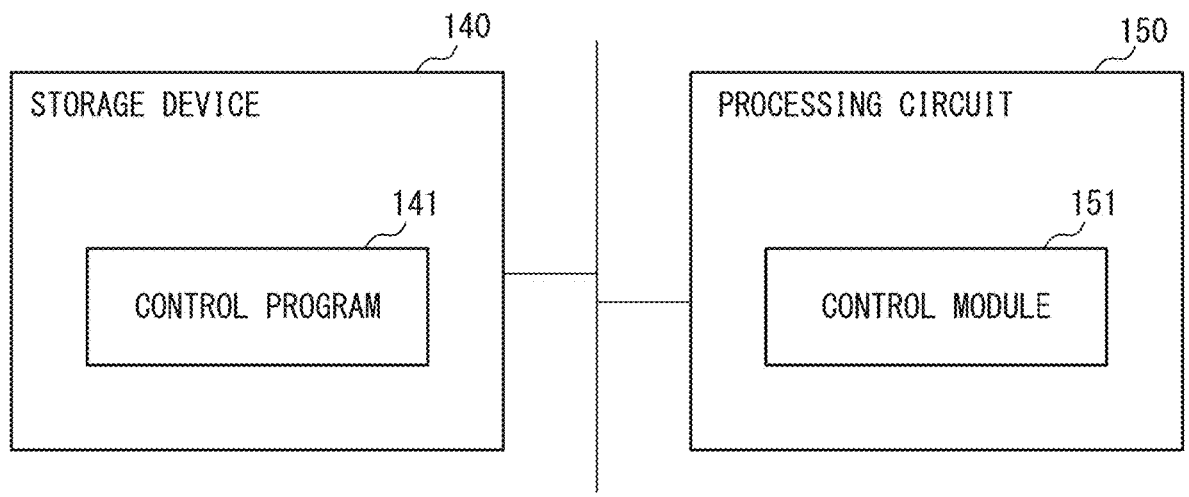
FIG. 12B is a diagram illustrating a schematic configuration of a storage device and a processing circuit.

FIG. 12B is a diagram illustrating a schematic configuration of the storage device and the processing circuit that are illustrated in FIG. 12A.

As illustrated in FIG. 12B, a control program 141 etc., are stored in the storage device 140. A program is a function module implemented by software operating on a processor. The processing circuit 150 reads a program stored in the storage device 140 and functions as a control module 151 by operating in accordance with the read program.

Figure 13:
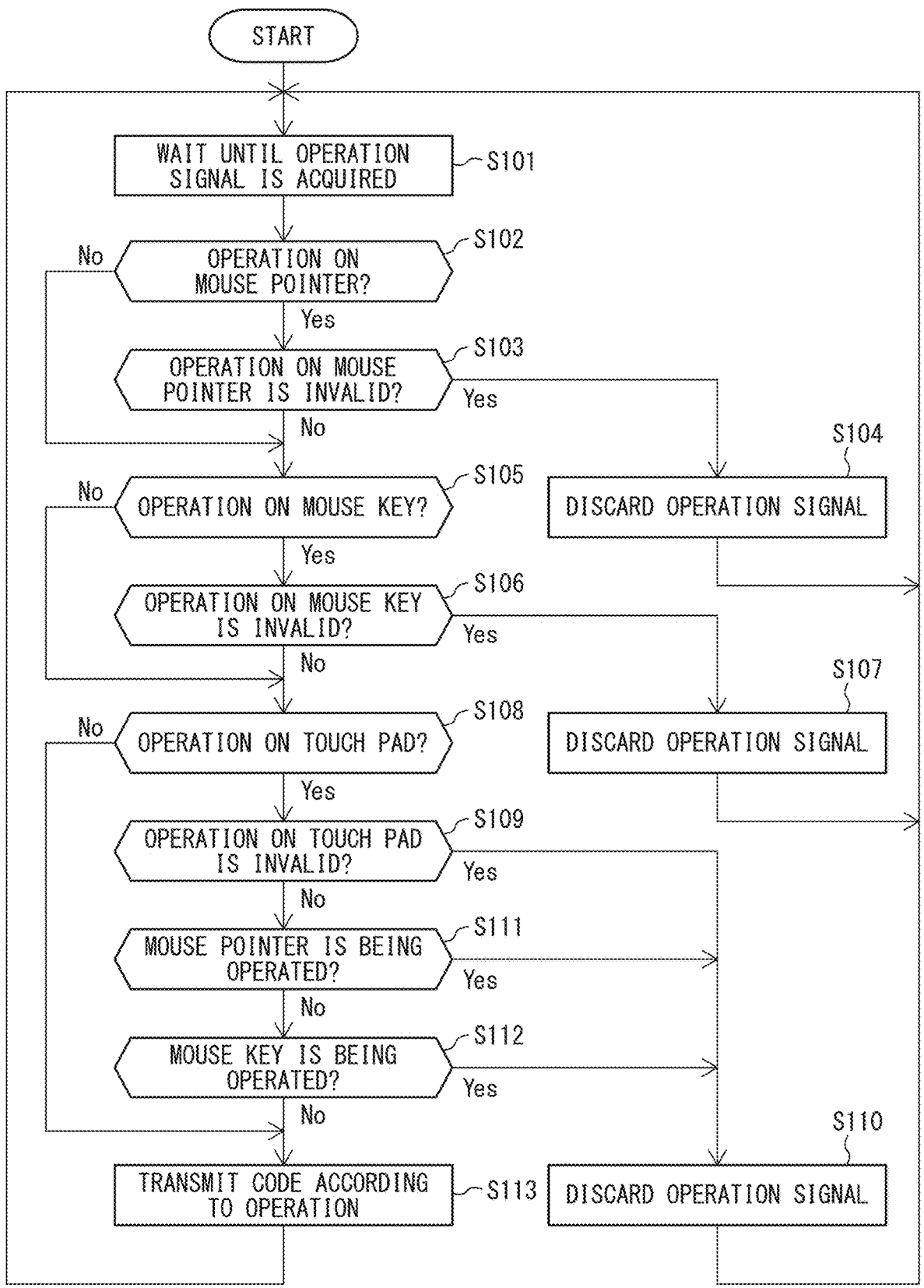
FIG. 13 is a flowchart illustrating an example of control processing executed by the keyboard apparatus.

FIG. 13 is a flowchart illustrating an example of control processing executed by the keyboard apparatus. The control processing is executed mainly by the processing circuit 150 in accordance with a program prestored in the storage device 140 in cooperation with each component in the keyboard apparatus 100.

First, the control module 151 waits until an operation signal is acquired (step S101). When an operation is performed on a key 102, the mouse pointer 103, the mouse key 104, or the touch pad 110 by the user, the key 102, the mouse pointer 103, the mouse key 104, or the touch pad 110 outputs an operation signal related to the operation to the operation signal reception circuit 120. When receiving an operation signal from the key 102, the mouse pointer 103, the mouse key 104, or the touch pad 110, the operation signal reception circuit 120 converts the received operation signal into a signal in a predetermined format and outputs the converted signal to the processing circuit 150.

Next, the control module 151 determines whether the operation indicated by the operation signal is an operation on the mouse pointer 103 (step S102). When the operation indicated by the operation signal is not an operation on the mouse pointer 103 (No in step S102), the control module 151 moves the processing to step S105. On the other hand, when the operation indicated by the operation signal is an operation on the mouse pointer 103 (Yes in step S102), the control module 151 determines whether an operation on the mouse pointer 103 is set to invalid (step S103). The control module 151 detects the state of the switch 105 and determines whether an operation on the mouse pointer 103 is set to invalid. When an operation on the mouse pointer 103 is set to invalid (Yes in step S103), the control module 151 invalidates the operation on the mouse pointer 103 by discarding the operation signal (step S104) and returns the processing to step S101.

On the other hand, when an operation on the mouse pointer 103 is not set to invalid (No in step S103), the control module 151 determines whether the operation indicated by the operation signal is an operation on the mouse key 104 (step S105). When the operation indicated by the operation signal is not an operation on the mouse key 104 (No in step S105), the control module 151 moves the processing to step S108.

On the other hand, when the operation indicated by the operation signal is an operation on the mouse key 104 (Yes in step S105), the control module 151 determines whether an operation on the mouse key 104 is set to invalid (step S106). The control module 151 detects the state of the switch 105 and determines whether an operation on the mouse key 104 is set to invalid. When an operation on the mouse key 104 is set to invalid (Yes in step S106), the control module 151 invalidates the operation on the mouse key 104 by discarding the operation signal (step S107) and returns the processing to step S101.

On the other hand, when an operation on the mouse key 104 is not set to invalid (No in step S106), the control module 151 determines whether the operation indicated by the operation signal is an operation on the touch pad 110 (step S108). When the operation is not an operation on the touch pad 110 (No in step S108), the control module 151 moves the processing to step S113.

On the other hand, when the operation indicated by the operation signal is an operation on the touch pad 110 (Yes in step S108), the control module 151 determines whether an operation on the touch pad 110 is set to invalid (step S109). The control module 151 detects the state of the switch 105 and determines whether an operation on the touch pad 110 is set to invalid. When an operation on the touch pad 110 is set to invalid (Yes in step S109), the control module 151 invalidates the operation on the touch pad 110 by discarding the operation signal (step S110) and returns the processing to step S101.

On the other hand, when an operation on the touch pad 110 is not set to invalid (No in step S109), the control module 151 determines whether the mouse pointer 103 is being operated (step S111). For example, the control module 151 determines whether the mouse pointer 103 is being operated, based on whether an operation signal is being received from the mouse pointer 103 and whether a predetermined time has elapsed after the last operation on the mouse pointer 103. When the mouse pointer 103 is being operated (Yes in step S111), the control module 151 invalidates the operation on the touch pad 110 by discarding the operation signal (step S110) and returns the processing to step S101. Thus, the control module 151 invalidates an operation on the touch pad 110 while accepting an operation on the mouse pointer 103. The keyboard apparatus 100 can invalidate an operation on the touch pad 110 when a user touches the touch pad 110 by mistake during an operation on the mouse pointer 103 and can suppress occurrence of an operation error by the user.

On the other hand, when the mouse pointer 103 is not being operated (No in step S111), the control module 151 determines whether the mouse key 104 is being operated (step S112). For example, the control module 151 determines whether the mouse key 104 is being operated, based on whether an operation signal is being received from the mouse key 104 and whether a predetermined time has elapsed after the last operation on the mouse key 104. When the mouse key 104 is being operated (Yes in step S112), the control module 151 invalidates the operation on the touch pad 110 by discarding the operation signal (step S110) and returns the processing to step S101. Thus, the control module 151 invalidates an operation on the touch pad 110 while accepting an operation on the mouse key 104. The keyboard apparatus 100 can invalidate an operation on the touch pad 110 when a user touches the touch pad 110 by mistake during an operation on the mouse key 104 and can suppress occurrence of an operation error by the user.

On the other hand, when the mouse key 104 is not being operated (No in step S112), the control module 151 transmits a code (command) corresponding to the acquired operation signal to the information processing apparatus through the communication device 130 (step S113) and moves the processing to step S101.

As described in detail above, the touch pad 110 provided on a side face of the enclosure 101 of the keyboard apparatus 100 is located at a position enabling excellent user operation based on Fitts's law. Consequently, the keyboard apparatus 100 can improve the convenience of a user.

Further, in a case where the keyboard, the mouse, and the touch pad are physically independent, a user needs to move his hand from each device and place his hand on each device when operating the physically independent devices.

On the other hand, according to the present embodiment, all of the plurality of keys 102, the mouse pointer 103, the plurality of mouse keys 104, and the plurality of touch pads 110 are provided in the enclosure 101 in the keyboard apparatus 100. Further, each of the plurality of keys 102, the mouse pointer 103, the plurality of mouse keys 104, and the plurality of touch pads 110 is located at a position enabling an easy operation without moving an index finger from the F-key 102d or the J-key 102e. Therefore, a user can easily operate each of the plurality of keys 102, the mouse pointer 103, the plurality of mouse keys 104, and the plurality of touch pads 110 without moving the hands from the home position. In particular, since the mouse pointer 103 and the plurality of mouse keys 104 are provided in the enclosure 101 in the keyboard apparatus 100, a mouse function can be realized with the keyboard apparatus 100 alone. Accordingly, the keyboard apparatus 100 can improve the convenience of the user.

Further, all of the plurality of keys 102, the mouse pointer 103, the plurality of mouse keys 104, and the plurality of touch pads 110 are provided in the enclosure 101. Therefore, a user can carry the plurality of keys 102, the mouse pointer 103, the plurality of mouse keys 104, and the plurality of touch pads 110 all together, and the keyboard apparatus 100 can improve the convenience, particularly for users who move frequently.

Figure 14:
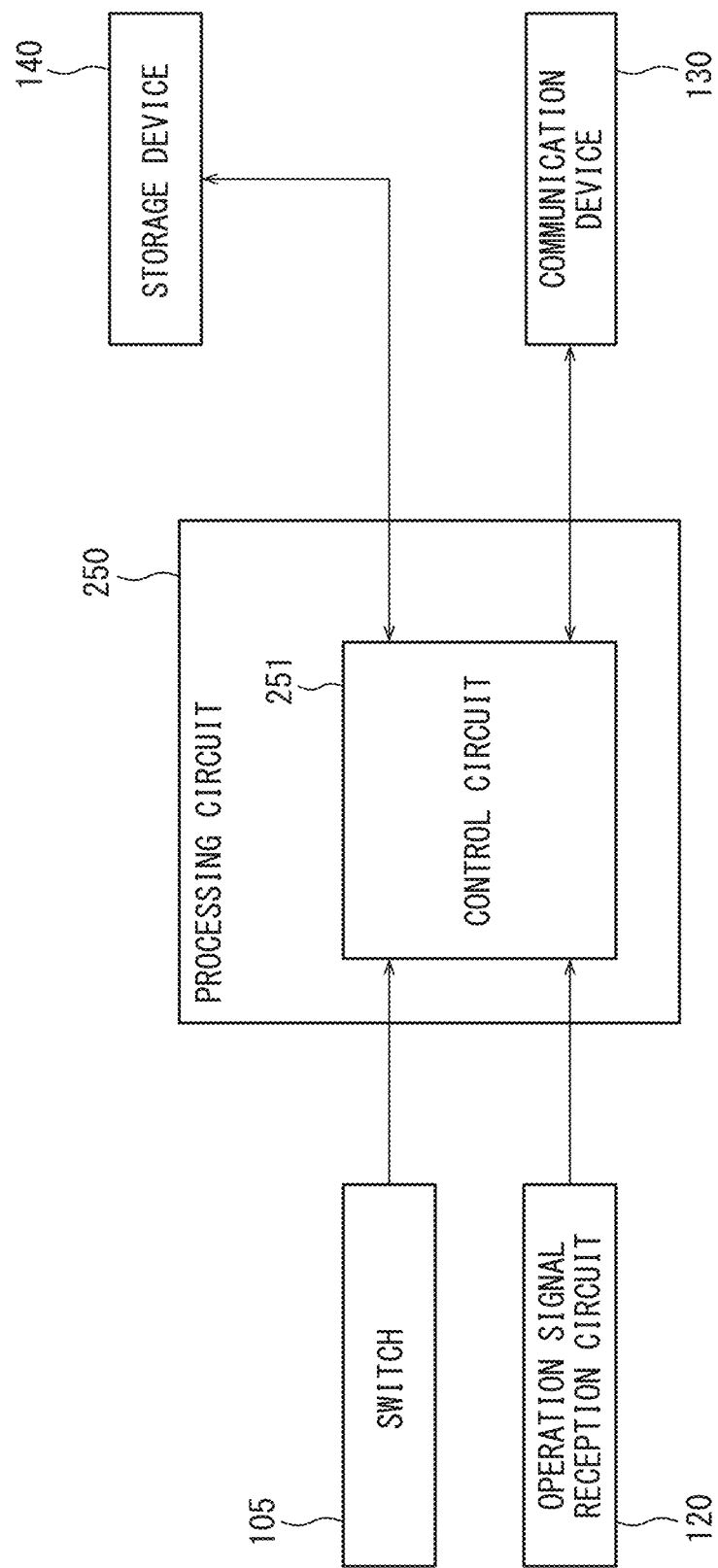
FIG. 14 is a diagram illustrating a schematic configuration of a processing circuit in a keyboard apparatus according to another embodiment.

FIG. 14 is a diagram illustrating a schematic configuration of a processing circuit in a keyboard apparatus according to another embodiment.

As illustrated in FIG. 14, the processing circuit 250 is used in place of the processing circuit 150 in the keyboard apparatus 100 and executes control processing etc. The processing circuit 250 includes a control circuit 251 etc. Each component may be independently configured with, for example, an integrated circuit, a microprocessor, or firmware.

The control circuit 251 is an example of a control module and has a function similar to that of the control module 151. The control circuit 251 receives an operation signal from the switch 105 and the operation signal reception circuit 120 and transmits a code according to the operation signal to an information processing apparatus through the communication device 130.

As described in detail above, the keyboard apparatus can further improve the convenience of a user when the processing circuit 250 is used as well.

The following supplementary note will be further disclosed in relation to the embodiment described above.

Supplementary Note 1

A keyboard apparatus including:
an enclosure;
a plurality of keys located on a top face of the enclosure; and
a touch pad provided on a front side face of the enclosure, wherein
a shortest distance between a space key out of the plurality of keys and an upper end of a side face on which the touch pad is provided is equal to or less than 55.1 mm.

According to the embodiment, the keyboard apparatus can further improve the convenience of a user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a presentation of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A keyboard apparatus comprising:
an enclosure;
a plurality of keys located on a top face of the enclosure; and
a touch pad provided on at least one side face of the enclosure, wherein
a shortest distance D between a key assigned to a home position out of the plurality of keys and an upper end of a side face on which the touch pad is provided, and a width W of the touch pad satisfy a compound inequality of:

$$2.2 < \log_2(1 + D/W) < 4.1,$$

wherein the compound inequality $\log_2(1+D/W)$ is a logarithmic term referred to as an index of difficulty (ID) and the numbers 2.2 and 4.1 are the lower and upper limits used to suitably locate the plurality of keys between the home position and the touch pad.

2. The keyboard apparatus according to claim 1, wherein the touch pad is provided on at least one side face of a front side face and a back side face of the enclosure.

3. The keyboard apparatus according to claim 1, wherein the touch pad is provided on a front side face of the enclosure, and
a shortest distance between a space key out of the plurality of keys and an upper end of a side face on which the touch pad is provided is equal to or less than 55.1 mm.

4. The keyboard apparatus according to claim 1, wherein a height of a front end of a first key located on a back side of a key assigned to a home position out of the plurality of keys is less than a height of a back end of the first key, and a height of a front end of a second key located on a front side of a key assigned to a home position is greater than a height of a back end of the second key.

5. The keyboard apparatus according to claim 1, further comprising a mouse key located between a key assigned to a home position out of the plurality of keys and the touch pad.

6. A keyboard apparatus comprising:
an enclosure;
a plurality of keys located on a top face of the enclosure;
a mouse pointer located on a top face of the enclosure; and
a touch pad provided on at least one side face of the enclosure, wherein
a shortest distance D between the mouse pointer and an upper end of a side face on which the touch pad is provided, and a width W of the touch pad satisfy a compound inequality of:

$$2 < \log_2(1 + D/W) < 6.$$

wherein the compound inequality $\log_2$ (1+D/W) is a logarithmic term referred to as an index of difficulty (ID) and the numbers 2 and 6 are the lower and upper limits used to suitably locate the touch pad relative to the mouse pointer.

7. The keyboard apparatus according to claim 6, wherein the mouse pointer is located between an F-key and a J-key out of the plurality of keys.

8. The keyboard apparatus according to claim 6, further comprising a mouse key located between the mouse pointer and the touch pad.

9. The keyboard apparatus according to claim 6, wherein the touch pad is provided on at least one side face of a front side face and a back side face of the enclosure.

10. The keyboard apparatus according to claim 6, wherein the touch pad is provided on a front side face of the enclosure, and a shortest distance between a space key out of the plurality of keys and an upper end of a side face on which the touch pad is provided is equal to or less than 55.1 mm.

* * * * *